UNITED STATES PATENT OFFICE 2,653,880

HEAT-ACTIVATED TEMPORARILY PRESSURE-SENSITIVE ADHESIVE TAPE

James O. Hendricks, White Bear Lake, and Ambrose F. Schmelzle, St. Paul, Minn., assignors to Minnesota Mining & Manufacturing Company, St. Paul, Minn., a corporation of Delaware No Drawing. Application September 15, 1949, Serial No. 115,958

6 Claims. (Cl. 117—68.5)

This invention relates to adhesive sheet material, conveniently in the form of an adhesive tape, and particularly to sheet material which on activation by heating, becomes and temporarily remains tacky and pressure-sensitive.

Normally tacky pressure-sensitive adhesive sheets and tapes have many well-known advantages over solvent-activated or heat-activated sheet material. In sealing packages, for example, the efficiency of the seal made with the pressure-sensitive type of adhesive tape does not depend on accurate timing of the application. In masking surfaces for spray painting or other purposes, the pressure-sensitive tapes are readily removed and readjusted so as better to fit the required pattern or curve. Cutouts, labels, and the like are easily handled and readily applied when provided with pressure-sensitive adhesive coatings. Drying or forced cooling of the adhesive layer is avoided.

Non-tacky activatible adhesive tapes have certain advantages, however, over the normally tacky and pressure-sensitive adhesive variety. For example, unwinding of such tapes from roll form requires no extra effort and places no extra strain on the backing member, since the adjacent layers are not adherently bonded together. Hence, relatively weak and easily delaminated backing materials such as untreated paper may be employed, as in the ordinary gummed tape or gummed labels, postage stamps, etc. Non-tacky sheet material may be cut into desired shapes and sizes from multiple-layer stacks or piles, and the layers easily separated for subsequent activation of the adhesive and application to a surface. No liner or slip-sheeting is required to prevent blocking or cohering of adjacent coated surfaces, as is necessary with double-coated sheets or tapes carrying a layer of normally tacky pressure-sensitive adhesive on both surfaces.

We have now been able to obtain many of the desired qualities of both the normally tacky, pressure-sensitive adhesive sheet and the non-tacky, heat-activated adhesive sheet in a single construction. Our novel sheet product is normally non-tacky. It may be wound up in roll form, and subsequently unwound without harm and without effort. The unprotected sheets may be placed in stacks and cut to shape, and the individual pieces then easily separated from the stack. However, on the application of heat to the sheet or strip, the adhesive portion is rendered tacky and pressure-sensitive, and it retains this property for a considerable time after being again cooled to room temperature. During this period of pressure-sensitivity, the tacky adhesive sheet material may be adhesively bonded to various surfaces, and may if desired be alternatively removed and replaced thereon several times, without loss of adhesive strength. If allowed to remain in contact with such surface for a length of time depending on the particular composition employed, the adhesive coating reverts to the non-tacky and non-pressure-sensitive state, but the sheet remains firmly bonded to the contacted surface.

These and other advantageous properties are obtained in our novel adhesive sheet materials by employing as the adhesive coating material compositions comprising certain amide-ester polymers having the property of "temporary tackiness" and containing both amide and ester linkages in the same polymeric unit, derived from alkanolamines and long-chain dibasic organic acids in accordance with the principles herein set forth. The term "temporary tackiness" as here used implies that the polymer may be rendered tacky and pressure-sensitive by heating, but will subsequently revert at normal room temperatures to a non-tacky condition. This change is accomplished without change in composition, such for example as the decrease in solvent content which accompanies the decrease in adhesiveness of a solvent-activated adhesive.

One specific composition having the properties desired, and which we prefer to employ in producing our novel adhesive sheet materials, was prepared as follows.

Example 1

In this example, the adhesive composition was prepared by heating and stirring together 40.7 parts by weight of monoethanolamine, 101 parts of sebacic acid, and 120.5 parts of dimerized linseed oil fatty acids. This represents molecular equivalent proportions of 1.0, 0.75 and 0.25 respectively. One-tenth percent of zinc chloride was added as a catalyst.

The dimerized fatty acids may be prepared by polymerization of the fatty acids of drying or semi-drying oils, e. g. linseed, soybean, or cottonseed oil, by any of a number of well-known methods: see, for example, the article by C. G. Goebel entitled "Polymerization of unsaturated fatty acids" appearing in the March 1947 issue of the Journal of the American Oil Chemists' Society. The amount of this material employed, considered as a dibasic acid, was calculated on the basis of its analytically determined acid number. Thus, the 120.5 parts by weight of dimerized linseed oil fatty acids here used was calculated on the basis of a sample having an acid number of 154; correspondingly, with dimerized cottonseed oil acids having an acid number of 177, only 104 parts by weight was required. We have used dimerized fatty oil acids having acid numbers of from 150 to 190, and iodine numbers of 80–100, with good results.

Where the parts by weight were in grams, the batch, contained in a distillation flask, was stirred by bubbling a stream of nitrogen up through the mass while heating. Under these conditions, heating for 23 hours at 120–160° C. followed by 14.5 hours at 180–205° C. resulted in a desired degree of reaction. The resinous product was fusible, low in acid number (the actual value being 20), and was light brown in color.

The product was soluble in chloroform. In isopropanol or butyl acetate, it dissolved with heating, but precipitated after a few days in the cold. It was soluble in hot toluene but came out immediately on cooling. It was insoluble in heptane. The material had a melting point of 82–86° C. (ball and ring) and a hardness value of about 26–27, measured on the "D" type Shore durometer at 80° F.

The resin was coated in a thin film on paper, which was then allowed to stand at room temperture for 3 days; when then tested, the coating was tack-free. On briefly heating the sheet to 120° C., i. e. to or above the melting point of the resin, the coating became tacky and pressure-sensitive, and when then cooled to room temperature could be readily adhered to various surfaces by contact therewith under moderate finger-tip pressure. Tackiness, as measured by the ability of the material to adhere to the fingers when lightly pressed thereagainst, was retained for about 65 minutes at room temperature, after which the adhesive coating soon became tack-free. This cycle could be repeated many times.

Using a larger batch and a mechanical stirrer, in an open kettle, the resin-forming reaction was completed by cooking for one hour at 150–175° C., 20 minutes at 175–200° C., and 3 hours at 200° C. The viscosity of the finished resin was 7200 centipoise measured at 150° C. A somewhat longer reaction time was required where the catalyst was omitted. The color of the product was improved by cooking in the absence of oxygen, viz., under an atmosphere of nitrogen or carbon dioxide.

A heat-activated tape or sheet material having temporary tackiness was also produced by forming thin coatings of the resinous amide-ester adhesive composition of Example 1 on a cloth backing. The resin was applied in melted form at 120–150° C., but alternatively could be applied as a freshly prepared solution in isopropanol or as a dispersion in water containing a small amount of an alkali, viz., ammonium or potassium hydroxide. After suitable aging at room temperature these coated sheets could be rolled up on themselves, or placed in stacks, and stored for long periods of time at normal room temperatures without blocking or adhering together.

Half-inch strips of the coated cloth sheet material were activated by heating briefly at 120° C., were pressed down on various surfaces, and allowed to remain in contact long enough to revert to the non-tacky state. They were then pulled away at right angles to the surface. On clean glass, the force required to remove the strip was 3600 grams. When the strip was allowed to stand at room temperature for 10 minutes after activation and before application to the glass surface, the removal force was reduced to 1100 grams. On steel or tin surfaces, the removal effort for bonds made after 10 minutes at room temperature was 2100–2300 grams per half inch width; at 20 minutes, the value dropped only to 2000–2100 grams. These values are much higher than those ordinarily obtained with normally tacky and pressure-sensitive adhesive tapes of the rubber-resin adhesive type, representative samples of which have given removal values of 300–700 grams per half inch width on similar surfaces.

The following additional examples illustrate other formulas which are also effective in providing temporary tackiness.

In these and other formulas, as well as in the formula of Example 1, the amounts of the specific component materials or equivalents must be held to within certain quite specific proportions in order to obtain the desired fusible and tough resins having temporary tackiness after activation. Its terms of the particular ingredients employed in the examples, the required relative amounts have been found to be within the following ranges, wherein all values are in terms of molecular equivalents:

| | |
|---|---|
| Monoethanolamine | 70–100 |
| Ethylene diamine | 30– 0 |
| Sebacic acid | 95– 50 |
| Dimerized fatty oil acids | 5– 50 |

The total molecular equivalents of monoethanolamine and ethylene diamine are substantially equal to the total equivalents of sebacic acid and dimerized fatty oil acids, in both cases totaling 100 as indicated. The amount of ethylene diamine is not greater than about six-tenths the amount of dimerized fatty oil acids, and, where the amount of ethylene diamine is zero, the amount of dimerized fatty oil acids is not greater than 40. The substitution of other equivalent components may require some variation from these exact values in order to produce equivalent results. As shown in Example 1, the reactants are heated together until the acid number is reduced at least to 35, preferably to about 20 or even less, but short of that point at which gelation occurs; that is, the resinous product still has the ability to melt to a liquid or plastic state. We have found that such products are further characterized by melting within the approximate range of 80–130° C. and by a Shore "D" durometer hardness value of about 10–50. A more convenient measurement for determining the desired end-point of the reaction when the same is carried out on a commercial scale is the measurement of viscosity, the batch being carried to a viscosity at 150° C. of about 3000–8000 centipoise. Thus, commercial batches made in accordance with Example 1 and taken to a viscosity of 4000–5000 cps. at 150° C. have given good results as coatings for our novel sheet products.

*Example 2*

| | Mols | Parts by weight |
|---|---|---|
| Monoethanolamine | 1 | 61 |
| Sebacic acid | .875 | 176.8 |
| Dimerized cottonseed oil acid | .125 | 78.8 |

The mixture was heated, together with 0.1 percent (.32 part by weight) of zinc chloride catalyst, for 17 hours at 140–145° C. followed by 14 hours at 200–210° C., under a nitrogen atmosphere. The product had an acid number of 22, melted at 99–101° C., and had a Shore "D"

hardness value of 50. Coated on a cloth backing and activated by heating to 120° C., the coating retained its tackiness or pressure-sensitivity for approximately 15 minutes at room temperature before reverting to the non-tacky state.

*Example 3*

|  | Mols | Parts by weight |
|---|---|---|
| Monoethanolamine | 1 | 30.5 |
| Sebacic acid | .95 | 96 |
| Dimerized cottonseed oil acid | .05 | 15.7 |
| Zinc chloride (catalyst), .1% | | .14 |

After heating the mixture for 16 hours at 147–153° C. and 23.5 hours at 195–200° C. under nitrogen, the acid number was 19, melting point 103–106° C., Shore "D" hardness 51, and tack retention period one minute.

Adhesives having tack retention periods of only a few seconds, i. e. less than about one minute, may be used as heat-activated adhesives but not with any degree of effectiveness as normally tacky and pressure-sensitive adhesives since their tackiness is reduced to an undesirably low level by the time they have cooled from activation temperature to room temperature. For example, a reaction product of equal molar proportions of monoethanolamine and sebacic acid, containing no dimerized acid, was almost completely lacking in tack retention, i. e., was non-tacky as soon as it was cooled to room temperature. The acid number of this polymer was 21 and its melting point was 115° C. Its hardness value was 58.

On the contrary, a resin formed by heating one mol of monoethanolamine, 0.5 mol of sebacic acid, and 0.5 mol of dimerized cottonseed oil acids for 16 hours at 147–153° C. and 31 hours at 195–200° C., as in Example 3, to an acid number of 16, had a melting point of 38–41° C., was still tacky after 24 hours at room temperature, and was too soft to be measured on the Shore durometer. A 60:40 ratio of sebacic acid and dimerized acids, however, provides a harder and higher-melting resin which reverts to a non-tacky state on standing at room temperature.

*Example 4*

|  | Mols | Parts by weight |
|---|---|---|
| Monoethanolamine | .95 | 29.0 |
| Ethylene diamine (anhd.) | .05 | 1.5 |
| Sebacic acid | .75 | 75.6 |
| Dimerized linseed oil acids | .25 | 91.0 |
| Zinc chloride, .1% | | .2 |

Heating for 1 hour at 45–130° C., 2 hours at 130–225° C., and 2 hours at 225–250° C. in an open kettle with constant stirring produced a resin having an acid number of 32, melting point of 94–99° C., hardness of 27, and a tack retention period of 20 minutes.

*Example 5*

|  | Mols | Parts by weight |
|---|---|---|
| Monoethanolamine | .85 | 58 |
| Ethylene diamine (70% solution in water) | .15 | 14 |
| Sebacic acid | .75 | 169 |
| Dimerized cottonseed oil acids | .25 | 174 |
| Zinc chloride, .1% | | .4 |
| Hydroquinone (antioxidant) | | 2 |

The materials were heated under constant agitation and in a $CO_2$ atmosphere. The heating cycle was 30 minutes at 40–140° C., 1 hour at 140°–150° C., 1 hour 45 minutes at 150–200° C., and 1 hour 15 minutes at 200° C. The resin had an acid number of 24, melting point of 104–113° C., hardness of 32, and tack retention period of 1–3 minutes. The viscosity was 3000 centipoise at 150° C.

When the formula of Example 5 was varied by reducing the proportion of dimerized acids to 0.2 mol and increasing the proportion of sebacic acid to 0.8 mol, the product had a tack retention period of less than about one minute. When the proportion of dimerized acids was increased to 0.5 mol (the proportion of sebacic acid being reduced to 0.5 mol), it increased the tack retention period and produced a useful, although a lower melting and somewhat softer adhesive. The melting point and hardness of such an adhesive are increased by increasing the percentage of ethylene diamine and correspondingly reducing the percentage of monoethanolamine, but beyond about 0.3 mol of ethylene diamine (with 0.7 mol monoethanolamine and 0.5 mol each of sebacic acid and dimerized fatty oil acids) the adhesion of the activated adhesive to glass and other surfaces is found to be undesirably low. At proportions much beyond about .5 mol of dimerized acids, even with an increased proportion of ethylene diamine the adhesive was too soft for many applications, and additionally was observed to oxidize to a gel state on prolonged aging, in spite of the presence of the antioxidant.

Where dimerized fatty oil acids have been specified in the above examples, they may be replaced by equivalent molar proportions of esters of these acids with readily volatile alcohols, e. g., methyl alcohol. The volatile alcohol is liberated during the reaction. It will be appreciated that commercial dimerized acids will include some minor proportion of trimer or other higher polymers as well as traces of various other components, and such mixtures, as well as the methyl esters, are contemplated as coming within the scope of the expression "dimerized fatty oil acids" when employed to designate a component of our amide-ester adhesive product.

Control of the tack-retention period (and of the adhesion value or tackiness) of the adhesive coating may be obtained by varying the proportions of the reactants, as indicated by the examples. The period of tack retention may also be controlled by compounding the resin with various additives. One material which is found to be useful for this purpose is candelilla wax, which has the additional advantage of greatly increasing the resistance to water vapor transmission of the coated sheet product.

TABLE 1

EFFECT OF ADDED CANDELILLA WAX ON TEMPORARY TACKINESS

| Resin of Example 1, parts by weight | Candelilla Wax, parts by weight | Period of Pack Retention, minutes |
|---|---|---|
| 100 | | 65 |
| 100 | 0.05 | 35 |
| 100 | .15 | 20 |
| 100 | 2.0 | 3 |
| 100 | 10.0 | 4 |

At proportions much above about 15 parts of added candelilla wax, the adhesive composition is found to be undesirably brittle, weak and friable.

Resinous materials also have an effect on the period of temporary tackiness. For example, the addition of thermoplastic resins such as rosin or derivatives such as ester gum, or of phenolic resins or the like is found to increase the duration of temporary tackiness, as well as increasing the strength of adhesive bond.

TABLE 2

EFFECT OF RESIN ADDITIVES ON TACK RETENTION

| Composition | Period of Tack Retention, minutes |
|---|---|
| Composition of Example 5 | 1–3 |
| Example 5—90 parts by wt. Phenolic Resin [1]—10 parts by wt | 5 |
| Example 5—100 parts by wt. Rosin—5 parts by wt | 87 |

[1] The particular phenolic resin employed was a 100% pure phenolic resin of the non-heat-reactive type, specific gravity 1.06, melting point 125–135° C., acid number 4–6, completely soluble in petroleum and coal tar solvents, ketones, and esters, and partially soluble in ethyl alcohol, available as "Barcum 1400."

Pigments, fillers and the like may also be added to these adhesives where desired. For example, whiting (powdered calcium carbonate) has been incorporated in a weight equal to, or even slightly greater than, the weight of the amide-ester resin. The pressure-sensitivity is thereby decreased, more pressure being required to effect adhesion of the activated surface to other surfaces, and the coated tape is non-blocking in roll or stack form at well above room temperatures. The period of tack retention after activation is substantially unchanged. Kaolin has also been added, with somewhat similar effect.

Unless recently activated, the potentially temporarily tacky adhesive compositions of the invention are substantially free of tack and substantially non-blocking at normal room temperatures of the order of 80° F. Thus, untreated kraft paper coated on one side with a layer of such an adhesive may be wound up into a tight roll, allowed to stand at room temperature for protracted periods, and then unwound from the roll without delamination or excessive fuzzing of the paper. Some slight sticking, sufficient only to prevent the roll from unwinding due to the inherent springiness of the paper, may be observed; but such adherence offers no significant resistance to planned unwinding of the sheet from the roll. A similar slight degree of adhesion may be noted between two coated surfaces; here again, the adhesive force is sufficient only to prevent the two sheets from falling apart, and is easily overcome without damage to adhesive surface or to backing.

These adhesives have value as coatings on untreated paper and cloth, for use as labels, fasteners, masks or protective coverings, and the like. Treated fibrous backings may be similarly coated. Non-fibrous films may also serve as backings or supporting surfaces for these adhesive compositions. In one specific example, moistureproofed regenerated cellulose film (moistureproof cellophane) was first coated on one surface with a low-adhesion sizing material. Cellulose tristearate and cellulose trilaurate are typical examples of well-known and effective low-adhesion sizing materials. The back-sized film was then coated on the other side with an adhesive composition containing 100 parts by weight of an amide-ester made in accordance with Example 1 hereinabove, and 25 parts of rosin, applied from a 35% solution in isopropanol. Whereas the amide-ester alone has a tack retention period of about 65 minutes, the blend with rosin remained tacky for about 24 hours. Nevertheless, because of the presence of the low-adhesion sizing coating it was possible to wind up the coated sheet immediately after removal of solvent and while the coating was still tacky, and then to allow the coating to revert to the non-tacky state while in roll form. It was found that the roll could subsequently be unwound without difficulty, and the adhesive surface reactivated and made temporarily tacky by the application of heat. The sheet product was transparent and made a desirable sealing or packaging tape, particularly for use on moistureproof cellophane, aluminum foil, and other analogous moisture-barrier wrappings and on printed sheets and packages.

Many other variations in the formula and preparation of the resinous adhesive, in the sheet material used as the backing member, and in the coating procedures will be obvious to those skilled in the art, in view of the disclosures here presented. We therefore do not wish to be restricted to specific examples and formulations herein set forth, but contemplate all equivalent products in sheet or tape form having a surface coating comprising a heat-activatible polymeric amide-ester which on activation has the property of temporary tackiness.

This application is a continuation-in-part of our copending application Serial No. 736,416, filed March 21, 1947, and now abandoned.

Having now described various embodiments of our invention for purposes of illustration, but without intent to be limited thereto, what we claim is as follows:

1. A normally non-tacky heat-activatible flexible adhesive sheet material capable of being stacked or rolled on itself at normal room temperatures without blocking, capable of being unwound from roll form with substantially no adhesive tension, and which after removal from the roll, activation by heating, and cooling to room temperature remains temporarily tacky and pressure-sensitive, said sheet material comprising a thin flexible backing member coated on at least one surface with a heat-activatible and potentially temporarily tacky adhesive composition comprising a low acid number, fusible heat reaction product of the following components in the indicated proportional molar equivalents:

| | |
|---|---|
| Monoethanolamine | 70–100 |
| Ethylene diamine | 30– 0 |
| Sebacic acid | 95– 50 |
| Dimerized fatty oil acids | 5– 50 | and wherein the proportional molar equivalents of said amines and of said acids each total substantially 100; the proportional molar equivalents of said ethylene diamine being not greater than about six-tenths the proportional molar equivalents of said dimerized fatty oil acids; and, where the amount of ethylene diamine is zero, the proportional molar equivalents of said dimerized fatty oil acids being not greater than about 40.

2. A normally non-tacky heat-activatible flexible adhesive sheet material capable of being stacked or rolled on itself at normal room temperatures without blocking, capable of being unwound from roll form with substantially no adhesive tension, and which after removal from the roll, activation by heating, and cooling to room temperature remains temporarily tacky and pressure-sensitive, said sheet material comprising a thin flexible backing member coated on at least one surface with a heat-activatible and potentially temporarily tacky adhesive composition comprising a resinous heat reaction product of one mol of monoethanolamine, about 0.75 mol of sebacic acid, and about 0.25 mol of dimerized fatty oil acids, said product melting between about 80° C. and 90° C. (ball and ring) and having an acid number not greater than about 20.

3. A coated sheet material according to claim 1 wherein the adhesive composition contains not more than about 15% of wax.

4. A coated sheet material according to claim 1 wherein the backing member is a non-fibrous film.

5. The coated sheet material of claim 4 wherein the backing is coated on one side with the adhesive composition and on the opposite side with a low-adhesion backsize.

6. A normally non-tacky and non-blocking but heat-activatible flexible adhesive tape in roll form, capable of being unwound from the roll with substantially no adhesive tension, and which after removal from the roll, activation by heating, and cooling to room temperature is temporarily tacky and pressure-sensitive, said adhesive tape comprising a paper backing coated on at least one surface thereof with a heat-activatible and potentially temporarily tacky composition comprising a low acid number, fusible heat reaction product of the following components in the indicated proportional molar equivalents:

| | |
|---|---|
| Monoethanolamine | 70–100 |
| Ethylene diamine | 30– 0 |
| Sebacic acid | 95– 50 |
| Dimerized fatty oil acids | 5– 50 | and wherein the proportional molar equivalents of said amines and of said acids each total substantially 100; the proportional molar equivalents of said ethylene diamine being not greater than about six-tenths the proportional molar equivalents of said dimerized fatty oil acids; and, where the amount of ethylene diamine is zero, the proportional molar equivalents of said dimerized fatty oil acids being not greater than about 40.

JAMES O. HENDRICKS.
AMBROSE F. SCHMELZLE.

References Cited in the file of this patent

UNITED STATES PATENTS

| Number | Name | Date |
|---|---|---|
| 2,379,413 | Bradley | July 3, 1945 |
| 2,469,108 | Fries | May 3, 1949 |
| 2,484,416 | Martin | Oct. 11, 1949 |